United States Patent
Kirillov

(10) Patent No.: US 11,275,146 B2
(45) Date of Patent: Mar. 15, 2022

(54) LIDAR SYSTEM WITH NON-UNIFORM SENSITIVITY RESPONSE

(71) Applicant: Infineon Technologies AG, Neubiberg (DE)

(72) Inventor: Boris Kirillov, Graz (AT)

(73) Assignee: Infineon Technologies AG, Neubiberg (DE)

( * ) Notice: Subject to any disclaimer, the term of this patent is extended or adjusted under 35 U.S.C. 154(b) by 666 days.

(21) Appl. No.: 16/184,561

(22) Filed: Nov. 8, 2018

(65) Prior Publication Data
US 2020/0150209 A1    May 14, 2020

(51) Int. Cl.
| | |
|---|---|
| *G01S 3/789* | (2006.01) |
| *G01S 17/10* | (2020.01) |
| *G01S 7/486* | (2020.01) |
| *G01S 7/4863* | (2020.01) |

(52) U.S. Cl.
CPC ............ *G01S 3/789* (2013.01); *G01S 7/4863* (2013.01); *G01S 17/10* (2013.01)

(58) Field of Classification Search
CPC ........ G01S 3/789; G01S 17/10; G01S 7/4863; G01S 17/42; G01S 7/4817; G01S 7/4816; G01S 7/4868
USPC ....................................................... 356/5.01
See application file for complete search history.

(56) References Cited

U.S. PATENT DOCUMENTS

| | | | |
|---|---|---|---|
| 10,317,534 B2* | 6/2019 | Eshel | G01S 7/4814 |
| 2008/0316628 A1* | 12/2008 | Nakajima | G02B 5/205 |
| | | | 359/888 |
| 2018/0209846 A1 | 7/2018 | Mandai et al. | |
| 2018/0275275 A1* | 9/2018 | Lundquist | G01S 17/32 |
| 2018/0329065 A1* | 11/2018 | Pacala | H04B 10/503 |

FOREIGN PATENT DOCUMENTS

| | | |
|---|---|---|
| JP | 2012202776 A | 10/2012 |
| KR | 20150045735 A | 4/2015 |
| KR | 20170097185 A | 8/2017 |

* cited by examiner

*Primary Examiner* — Daniel L Murphy
(74) *Attorney, Agent, or Firm* — Murphy, Bilak & Homiller, PLLC

(57) ABSTRACT

A light detection and ranging (LIDAR) system includes a light detector having a first scanning mirror and a light sensor aligned with the first scanning mirror. The first scanning mirror is configured to rotate about a first axis and to reflect incident light pulses toward the light sensor at different angles of rotation with respect to the first axis. The light sensor is configured to detect reflected light pulses from the first scanning mirror over a range of the angles of rotation. An input area of the light detector has a non-uniform sensitivity response along a first direction.

20 Claims, 11 Drawing Sheets

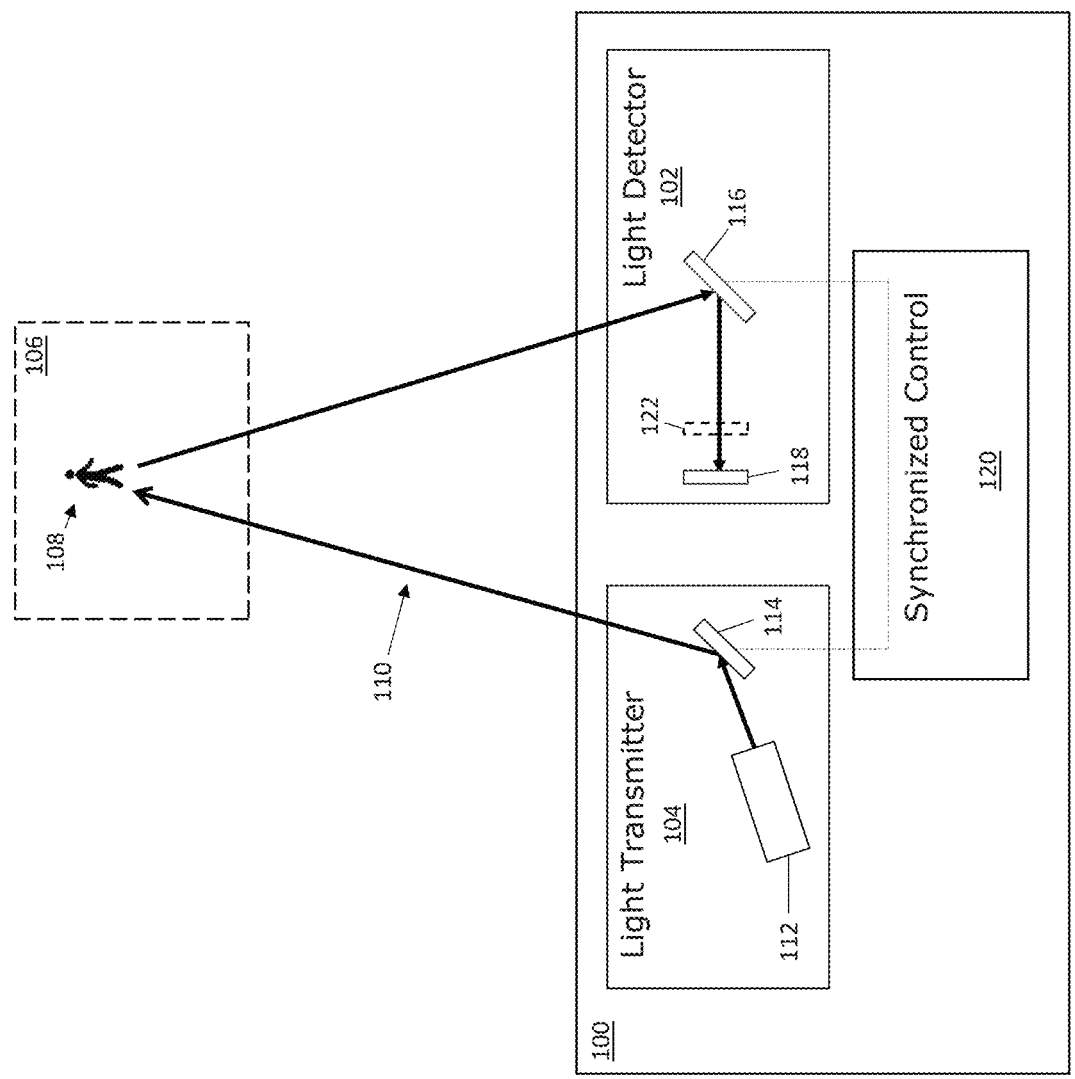
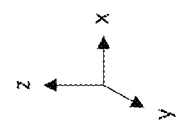
Figure 1

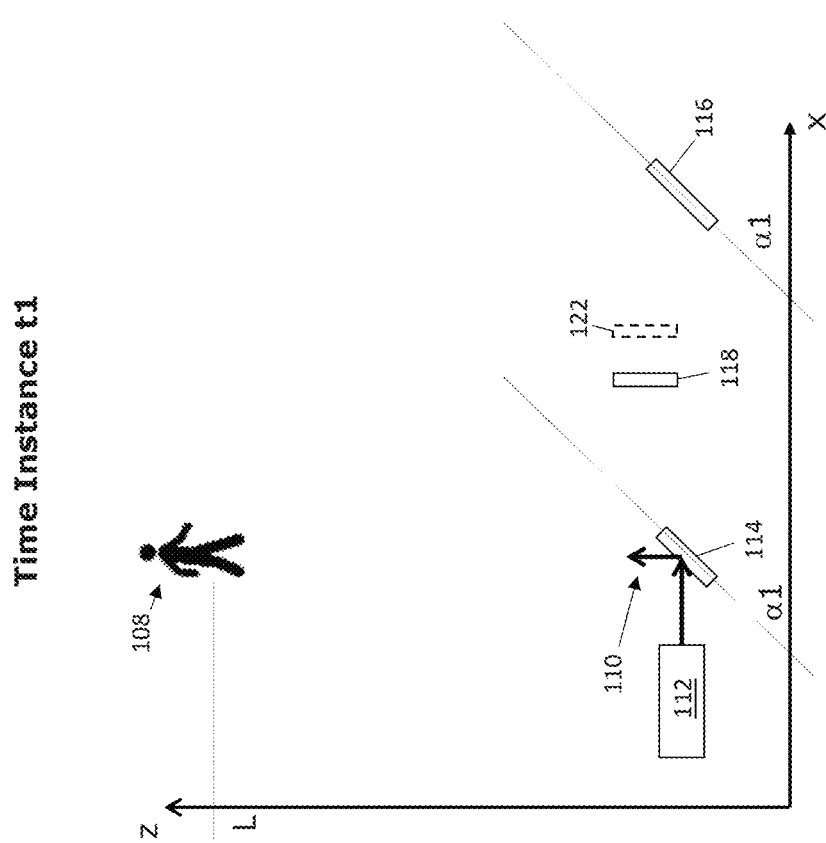

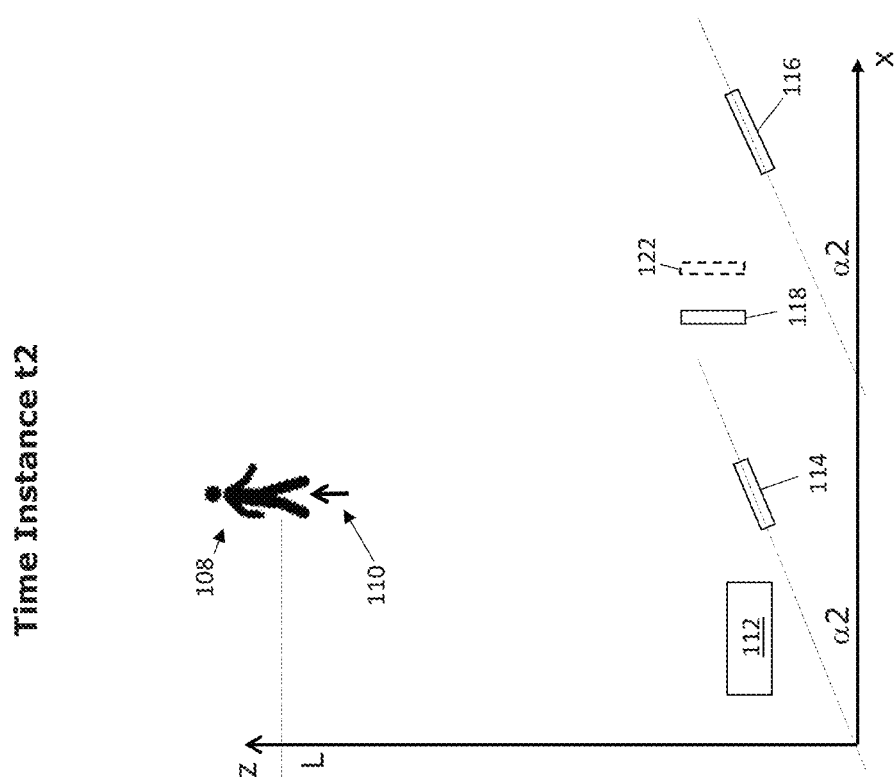

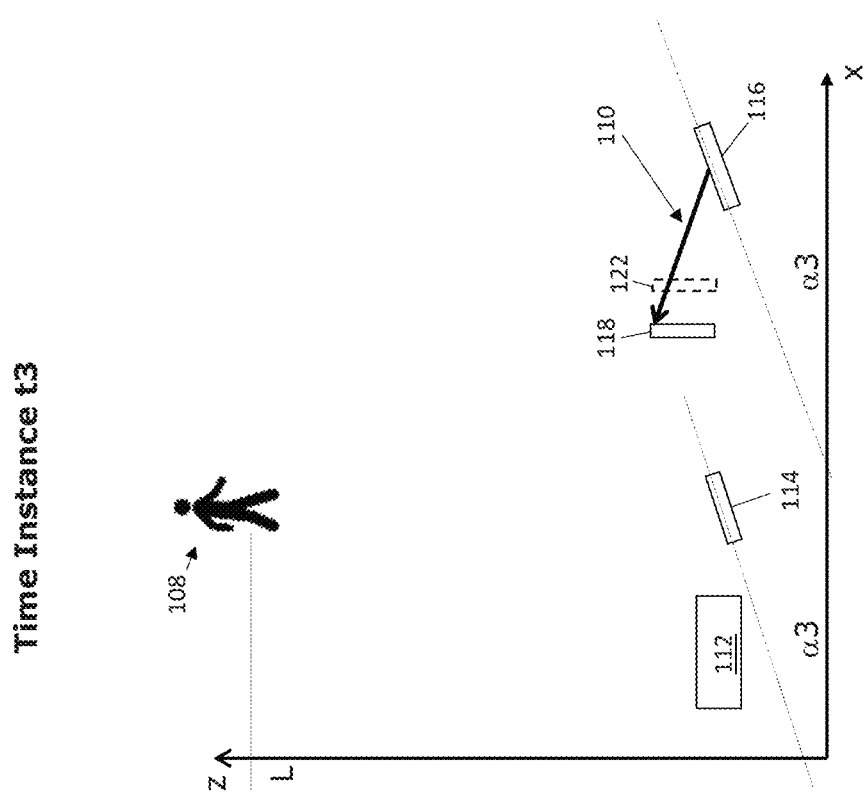

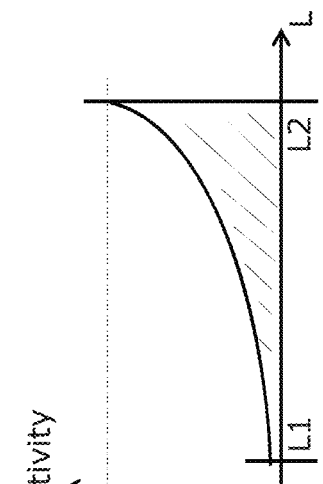
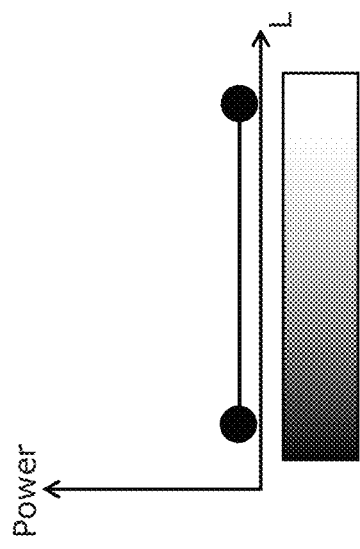
Figure 7B
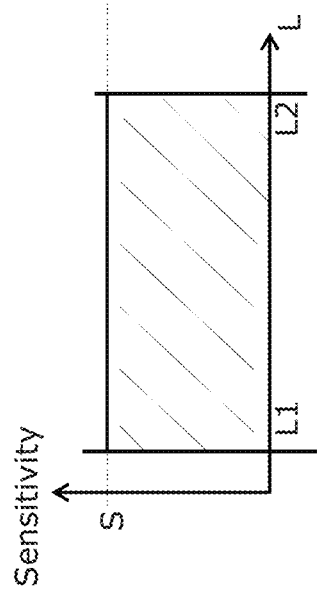
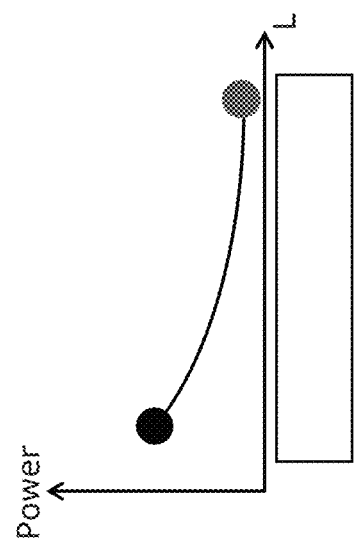
Figure 7A

LIDAR SYSTEM WITH NON-UNIFORM SENSITIVITY RESPONSE

BACKGROUND

Light detection and ranging (LIDAR) is a detection technique that works on the principle of time of flight measurement using light pulses from a laser. LIDAR measures distance to a target by illuminating the target with pulsed laser light and measuring the reflected pulses with a sensor. In some LIDAR systems, a transmit scanning mirror steers light pulses toward a target and a receive scanning mirror steers reflected light towards a detector. Both scanning mirrors are synchronized in that the mirrors rotate with the same frequency and phase. The angle of the receive mirror at the moment a light pulse reflected from a target reaches the receive mirror depends on the distance to the target. Hence, incoming light pulses may be reflected off the receive mirror to the detector at different angles relative to the rotational axis of the receive mirror even if the original light pulses were emitted from the LIDAR system in the same transmit direction and angle. For example, if a first target is at a distance D1 with respect to the LIDAR system and a second target is at a distance D2 different than D1, light pulses emitted from the LIDAR system in the same transmit direction and angle will reflect off the targets and reach the receive mirror at different time instances. The light pulses will reflect off the receive mirror to the detector at different angles, the angle difference being a function of the delta between distances D1 and D2. The reflected light pulses impact different regions of the detector in this example, due to the difference in reflection angles of the receive mirror.

Conventional LIDAR light detectors have uniform sensitivity across the light detection area of the detector. As such, light pulses reflected off targets located at different distances from the LIDAR system but emitted in the same transmit direction and angle will have different detected power levels at the detector since light pulses which travel longer have more energy loss than light pulses which travel less distance. Conventional LIDAR systems are designed to provide wide dynamic range of received light pulses. However, wide dynamic range typically requires time-dependent amplification and therefore is difficult and expensive to implement.

Hence, there is a need for a more cost-effective and less complex light detector for LIDAR systems.

SUMMARY

According to an embodiment of a light detection and ranging (LIDAR) system, the LIDAR system comprises a light detector including a first scanning mirror and a light sensor aligned with the first scanning mirror. The first scanning mirror is configured to rotate about a first axis and to reflect incident light pulses toward the light sensor at different angles of rotation with respect to the first axis. The light sensor is configured to detect reflected light pulses from the first scanning mirror over a range of the angles of rotation. An input area of the light detector has a non-uniform sensitivity response along a first direction.

In one embodiment, the light detector comprises an array of light sensors and a gradient optical filter interposed between the array of light sensors and the first scanning mirror, and the gradient optical filter has a non-uniform filter characteristic along the first direction.

Separately or in combination, the gradient optical filter may comprise a metal film deposited on a surface of the array of light sensors facing the first scanning mirror.

Separately or in combination, the sensitivity of the gradient optical filter monotonically may increase with increasing distance from a central part of the gradient optical filter and the central part of the gradient optical filter may be aligned with a central part of the array of light sensors.

Separately or in combination, the first scanning mirror may be a one-dimensional MEMS mirror configured to rotate about a single axis.

Separately or in combination, the light detector may comprise an array of light sensors and each light sensor of the array of light sensors may comprise an input area having a non-uniform sensitivity response along the first direction.

Separately or in combination, the light detector may comprise an avalanche photodiode array and individual pixels or groups of pixels of the avalanche photodiode array may have different sensitivities.

Separately or in combination, the light detector may comprise an array of light sensors and an interference filter interposed between the array of light sensors and the first scanning mirror, and the interference filter may have a non-uniform filter characteristic along the first direction.

Separately or in combination, the sensitivity of the input area of the light detector may increase as a function of the square of target distance from the LIDAR system.

Separately or in combination, the LIDAR system may further comprise a light transmitter configured to emit light pulses, and the rotation of the first scanning mirror may be synchronized to a scanning of the light transmitter.

Separately or in combination, the light transmitter may comprise a laser light source and a second scanning mirror aligned with the laser light source, and a rotation of the first scanning mirror may be synchronized with a rotation of the second scanning mirror so that the rotation of the first scanning mirror and the rotation of the second scanning mirror have the same frequency.

Separately or in combination, the second scanning mirror may be a one-dimensional or two-dimensional MEMS mirror.

Separately or in combination, the light detector may be configured to output generally constant power over the range of angles of rotation for which the light detector is configured to detect reflected light pulses from the first scanning mirror.

Separately or in combination, the LIDAR system may be a coaxial LIDAR system.

According to another embodiment of a LIDAR system, the LIDAR system comprises a first scanning mirror, an array of light sensors and a gradient optical filter interposed between the array of light sensors and the first scanning mirror. The first scanning mirror is configured to reflect incident light pulses toward the array of light sensors at different angles of rotation with respect to a first axis. The gradient optical filter has a non-uniform sensitivity response along a first direction.

In one embodiment, the gradient optical filter comprises a metal film deposited on a surface of the array of light sensors facing the first scanning mirror.

Separately or in combination, the sensitivity of the gradient optical filter may monotonically increase with increasing distance from a central part of the gradient optical filter, and the central part of the gradient optical filter may be aligned with a central part of the array of light sensors.

Separately or in combination, the first scanning mirror may be a one-dimensional MEMS mirror configured to rotate about a single axis.

Separately or in combination, the sensitivity of the gradient optical filter may increase as a function of the square of target distance from the LIDAR system.

Separately or in combination, the array of light sensors may be configured to output generally constant power over the range of angles of rotation for which the array of light sensors is configured to detect reflected light pulses from the first scanning mirror.

Separately or in combination, the LIDAR system may further comprises a light transmitter configured to transmit first and second light pulses in a first transmit direction, wherein at a first angle of rotation, the first scanning mirror may be configured to reflect the first light pulse reflected by an object at a first distance from the LIDAR system toward a first region of the input area of the array of light sensors, wherein at a second angle of rotation, the first scanning mirror may be configured to reflect the second light pulse reflected by an object at a second distance from the LIDAR system toward a second region of the input area of the array of light sensors, and wherein the first and second regions of the input area of the array of light sensors may have different sensitivity responses.

According to an embodiment of a method of operating a LIDAR system having a light detector that includes a first scanning mirror and a light sensor aligned with the first scanning mirror, an input area of the light detector having a non-uniform sensitivity response along a first direction, the method comprises: rotating the first scanning mirror about a first axis to reflect incident light pulses toward the light sensor at different angles of rotation with respect to the first axis, wherein at a first angle of rotation the first scanning mirror reflects a first light pulse transmitted by a transmit scanner of the LIDAR system in a first transmit direction and reflected by an object at a first distance from the LIDAR system toward a first region of the input area of the light detector, and wherein at a second angle of rotation the first scanning mirror reflects a second light pulse transmitted by the transmit scanner in the first transmit direction and reflected by an object at a second distance from the LIDAR system toward a second region of the input area of the light detector, wherein the first and second regions of the input area of the light detector having different sensitivity responses; and detecting reflected light pulses from the first scanning mirror at the light sensor over a range of the angles of rotation.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 1 illustrates a block diagram of an embodiment of a light detection and ranging (LIDAR) system having a light detector with a non-uniform sensitivity response.

FIGS. 2A through 2C illustrate a light pulse emitted from the LIDAR system shown in FIG. 1 during different time instances.

FIGS. 7A and 7B compare the output power response and sensitivity of the light detector in FIG. 6 with and without a filter that yields the non-uniform sensitivity response.

DETAILED DESCRIPTION

Figure 3B:
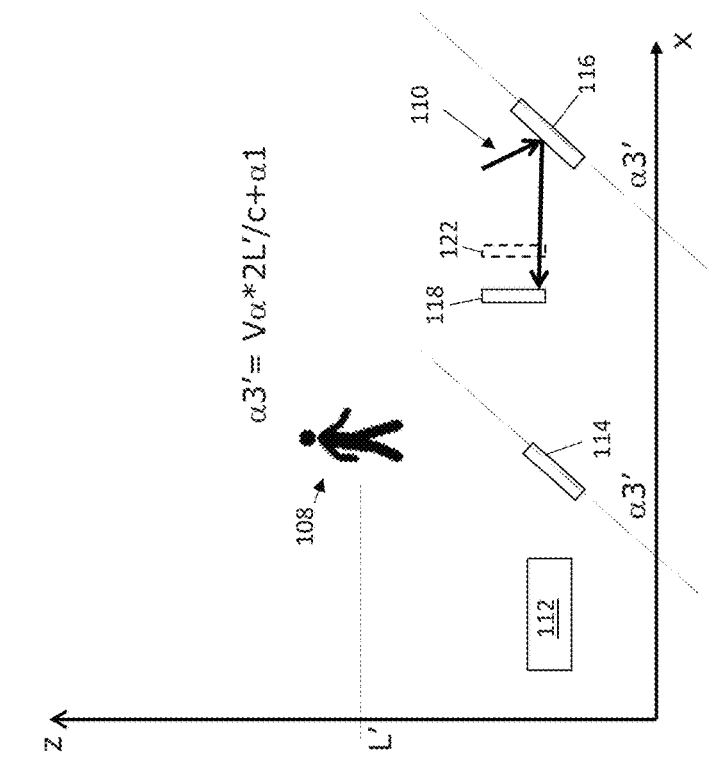
FIGS. 3A and 3B illustrate the effect target distance has on reflected light pulses received by the LIDAR system shown in FIG. 1.

The embodiments described herein provide a light detection and ranging (LIDAR) system which has a light detector with a non-uniform sensitivity response. In some embodiments, the non-uniform sensitivity response of the light detector is realized by a filter interposed between a light sensor and a scanning mirror on the receive side of the LIDAR system. In other embodiments, the non-uniform sensitivity response of the light detector is realized by individual light sensing elements or groups of light sensing elements with different sensitivities on the receive side of the LIDAR system. In each case, the non-uniform sensitivity response of the light detector is implemented so that the light detector outputs generally constant power over a range of target distances. The LIDAR system is described next in more detail.

FIG. 1 illustrates an embodiment of a LIDAR system 100 having a light detector 102 with a non-uniform sensitivity response, the sensitivity of the light detector 102 indicating how much the output of the light detector 102 changes as a function of light energy. The LIDAR system 100 also includes a light transmitter 104 for emitting pulses of light toward a target field 106. The target field 106 is an area or space scanned by the LIDAR system 100 for targets 108. If a target 108 is present in the target field 106, light pulses emitted from the transmit side of the LIDAR system 100 may reflect off the target 108 in a direction toward the light detector 102. The size of the target field 106 depends on the application, and may vary depending on the type of components used in the LIDAR system 100.

FIG. 1 shows a single pulse of light 110 emitted from the light transmitter 104 on the transmit side of the LIDAR system 100 and reflected off a target 108 located within the target field 106 in a direction toward the light detector 102. The light transmitter 104 includes a laser light source 112 and a transmit scanning mirror 114 aligned with the light source 112. The laser light source 112 may be, for example, a solid-state laser. Still other types of laser light sources may be used. The transmit scanning mirror 114 is configured to rotate about a first axis (e.g., z) and reflect light pulses emitted from the laser light source 112 toward the target field 106 at different angles of rotation with respect to the first axis. For example, a single laser 112 may be aligned with a single transmit scanning mirror 114 that can be reoriented to view any part of the target field 106. The transmit scanning mirror 114 spins at a rapid rate. In one embodiment, the transmit scanning mirror 114 is a one-dimensional (1D) or two-dimensional (2D) microelectromechanical system (MEMS) mirror. Other embodiments may include a flash laser which has a single light source that illuminates the field of view in a single pulse, or scanning systems which use a phased array laser that can illuminate any direction by using a microscopic array of individual antennas, a pixelated light source having a 1D or a 2D array of individually controllable pixels, etc. One or more additional optical components (not shown) may be provided between the laser light source 112 and the transmit scanning mirror 114, depending on the type of laser light source 112 and transmit scanning mirror 114 employed. In one embodiment, a 1D MEMS mirror is used and light pulses emitted from the transmit side of the LIDAR system 100 are shaped into a vertical or horizontal line extending perpendicular to the light propagation direction rather than using a laser point for scanning the target field 106. In another embodiment, a 2D MEMS mirror is used for scanning the target field 106.

At the receive side of the LIDAR system 100, the light pulse 110 which is reflected off the target 108 located in the target field 106 is received at the light detector 102. The light detector 102 includes a receive scanning mirror 116 and a light sensor 118 aligned with the receive scanning mirror 116. The receive scanning mirror 116 is configured to rotate about a first axis (e.g. z or y) and to reflect incident light pulses toward the light sensor 118 at different angles of rotation with respect to the first axis. In one embodiment, the receive scanning mirror 116 is a 1D or 2D MEMS mirror. In the case of a 1D receive scanning mirror 116, the MEMS mirror is configured to rotate about a single axis (e.g. z).

The light sensor 118 is configured to detect light pulses reflected from the receive scanning mirror 116 over a range of angles of rotation for the receive scanning mirror 116. In one embodiment, the light sensor 118 is a solid-state photodetector such as silicon avalanche photodiode, or is a photomultiplier. For example, the light sensor 118 may be an array of light sensors such as a pixelated light sensor which has a 1D or 2D array of individually controllable light-sensing pixels. The light sensor 118 instead may be an avalanche photodiode array comprised of individual light-sensing pixels. Still other types of light sensors may be used.

Instead of the transmit/receive scanning mirror configuration shown in FIG. 1, the LIDAR system 100 may be a coaxial LIDAR system. In the case of a coaxial LIDAR system, the laser beam is reflected from a 45° mirror having an elliptical shape. The light is then reflected by the transmit scanning mirror 114 to a distant target. Some of the backscattered light is returned via the transmit scanning mirror 114, reflected from a primary mirror to a secondary mirror, and then to the light sensor 118. In yet another embodiment, scanning mirror 114 may be the only scanning mirror. According to this embodiment, the single scanning mirror scans the emitted laser light to the environment and directs the received light to the light sensor 118. In general, the LIDAR system 100 may have any typical LIDAR transmit/receive scanning mirror configuration.

The LIDAR system 100 includes a controller 120 such as an application-specific integrated circuit (ASIC), microcontroller, microprocessor, digital signal processor (DSP), etc. for synchronizing the angle of rotation of the receive scanning mirror 116 with the angle of rotation of the transmit scanning mirror 114, to align directions of different transmitted scan lines. The same or different controller 120 may control the laser source 112 and/or the light sensor 116. Separate controllers or devices may instead be provided for the laser source 112 and the light sensor 116. In either case, the synchronized angle of rotation of the scanning mirrors 114, 116 determines which receiving directions are directed to the light detector 102 at a specific time instance. The term "synchronized" as used herein with respect to the angle of rotation of the scanning mirrors 114, 116 means the scanning mirrors 114, 116 move with the same frequency/speed. The angle of rotation of the scanning mirrors 114, 116 may have the same or different amplitude (maximum and minimum angles) and/or may have a phase offset, but are still considered synchronized so long as the scanning mirrors 114, 116 move at the same frequency/speed.

The light detector 102 has an input area 122 for receiving light pulses reflected off targets 108 located in the target field 106 of the LIDAR system 100. The input area 122 of the light detector 102 has a non-uniform sensitivity response along a first direction. The input area 122 of the light detector 102 may be part of the light sensor 118 or a filter interposed between the light sensor 118 and the receive scanning mirror 116. The direction along which the input area 122 of the light detector 102 has a non-uniform sensitivity response may be perpendicular to the axis about which the receive scanning mirror 116 is configured to rotate. For example, if the receive scanning mirror 116 is configured to rotate about axis z in FIG. 1, then the input area 122 of the light detector 102 has a non-uniform sensitivity response along direction x or y in FIG. 1. This way, light pulses reflected off targets 108 located closer to the LIDAR system 100 are detected with less sensitivity and light pulses reflected off targets 108 located farther from the LIDAR system 100 are detected with greater sensitivity. The non-uniform sensitivity response of the input area 122 of the light detector 102 is implemented so that the light detector 102 outputs detector signals of laser light reflected from targets such that the amplitude of the detector signals is independent of the range of target distances, thereby counteracting the effect distance has on light pulse energy. In one embodiment, the sensitivity of the input area 122 of the light detector 102 increases as a function of the square of target distance (L) from the LIDAR system 100. Typically, a threshold is used for determining a receive time of the reflected light pulse from the detector signal. If the detector output signal rises above the threshold, the LIDAR system 100 determines that a reflected light pulse is received and a point in time is measured. The use of a light detector 102 having non-uniform sensitivity allows for using a single threshold value rather than adjusting the threshold value during a receiving time interval.

Operation of the LIDAR system 100 is described next in more detail with reference to FIGS. 2A through 2C. FIGS. 2A through 2C illustrate the light pulse 110 shown in FIG. 1 at different time instances.

FIG. 2A shows the light pulse 110 at time instance t1 at which point the light pulse 110 reflects off the transmit scanning mirror 114 toward the target field 106 of the LIDAR system 100 at an angle $\alpha 1$ with respect to the rotational axis (e.g., z) of the transmit scanning mirror 114. The transmit and receive scanning mirrors 114, 116 are shown with the same angle $\alpha 1$ in FIG. 2A with respect to the rotational axis (e.g., z) of the scanning mirrors 114, 116, but instead may have a phase offset as explained above. In either case, the transmit and receive scanning mirrors 114, 116 are synchronized by the LIDAR controller 120 and therefore the angle of each scanning mirror changes at the same frequency/speed.

FIG. 2B shows the light pulse 110 at time instance t2 at which point the light pulse 110 impacts a target 108 located within the target field 106 of the LIDAR system 100 at a distance L=c(t2−t1) where c is the speed of light. The light pulse 110 reflects off the target 108 and propagates in all directions. The transmit scanning mirror 114 is at angle $\alpha 2$ with respect to the rotational axis (e.g. z) of the transmit scanning mirror 114 at time instance t2. The receive scanning mirror 116 may be at the same or different angle at time instance t2, depending on whether the controller 120 implements a phase offset between the scanning mirrors 114, 116.

FIG. 2C shows the light pulse 110 at time instance t3 at which point the light pulse 110 reflected off the target 108 and off the receive scanning mirror 116 impacts the light sensor 118 on the receive side of the LIDAR system 100. The receive scanning mirror 116 is at angle $\alpha 3$ with respect to the rotational axis (e.g. z) of the receive scanning mirror 116 at time instance t3. Again, the transmit scanning mirror 114 may be at the same or different angle at time instance t3 depending on whether the controller 120 implements a phase offset between the scanning mirrors 114, 116.

The angular speed of the synchronized scanning mirrors 114, 116 may be represented by $V\alpha$ [°/sec]. The angular difference of the receive scanning mirror 116 between time instance t1 and time instance t3 is given by $\alpha 3 - \alpha 1 = V\alpha * 2 L/c$ where $2 L/c$ represents time of flight of the light pulse 110. The scanning mirror angle $\alpha 3 = V\alpha * 2 L/c + \alpha 1$ at time instance t3 depends on the distance L to the target 108. That is, for two identical pulses of light emitted by the light transmitter 112 in the same transmit direction (at the same transmit scanning mirror angle) but at different points in time and which impact targets at different distances from the LIDAR system 100, the respective reflected light pulses will impact different parts of the light sensor 118 due to the different times of flight for the two light pulses. As such, the light sensor 118 is sized appropriately to receive reflected light pulses from targets located within a range of distances L to L' from the LIDAR system 100, the range of distances L to L' corresponding to the target field 106 of the LIDAR system 100. The light sensor 118 receives light signals coming from different directions due to continuous mirror rotation changing the angle at which light reaches the light sensor 118. Ambient light is also received at the receive scanning mirror 116, however in view of the use the receive scanning mirror 116, only a small portion is reflected from the scanning mirror to the light sensor 118.

Figure 3A:
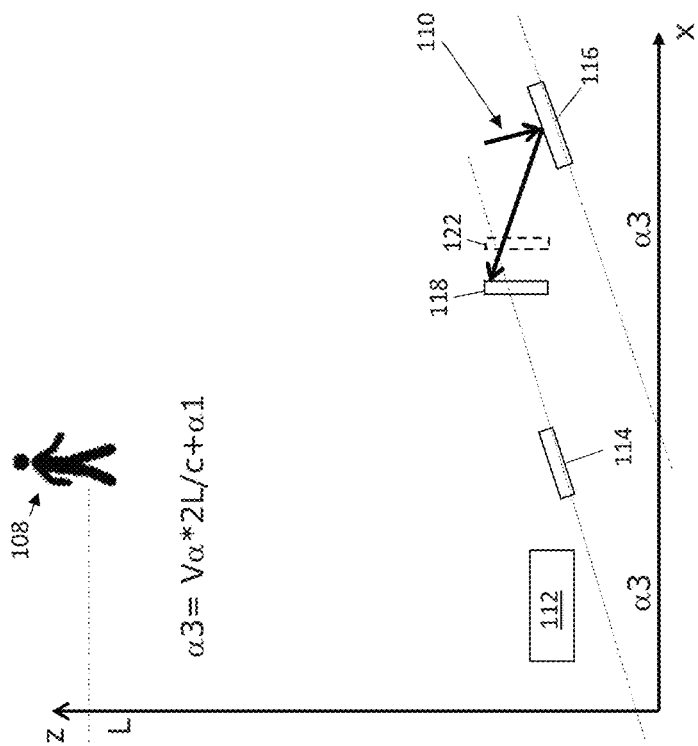

FIG. 3A illustrates a target 108 located at a maximum detectable distance L from the LIDAR system 100. The light sensor 118 is not sized to receive light pulses reflected off targets located at distances further than L from the LIDAR system 100.

FIG. 3B illustrates a target 108 located at a minimum detectable distance L' from the LIDAR system 100. The light sensor 118 is not sized to receive light pulses reflected off targets located at distances closer than L' to the LIDAR system 100.

In the example illustrated in FIGS. 3A and 3B, the LIDAR system 100 has a detectable target distance range defined by L and L'. The scanning mirror angle at time instance t3 is given by $\alpha 3 = V\alpha * 2 L/c + \alpha 1$ for the target 108 located at distance L, whereas the scanning mirror angle at time instance t3 is given by $\alpha 3' = V\alpha * 2 L'/c + \alpha 1$ for the target 108 located at distance L'. Hence, the part of the light sensor 118 impacted by a reflected light pulse depends on the target distance.

Figure 5:
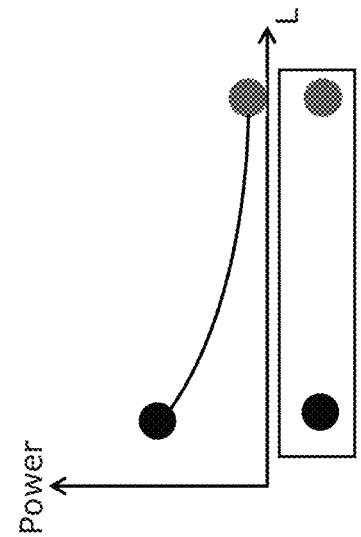
FIG. 5 illustrates a waveform diagram of the output power response of the array of light sensors shown in FIG. 4.
Figure 4:
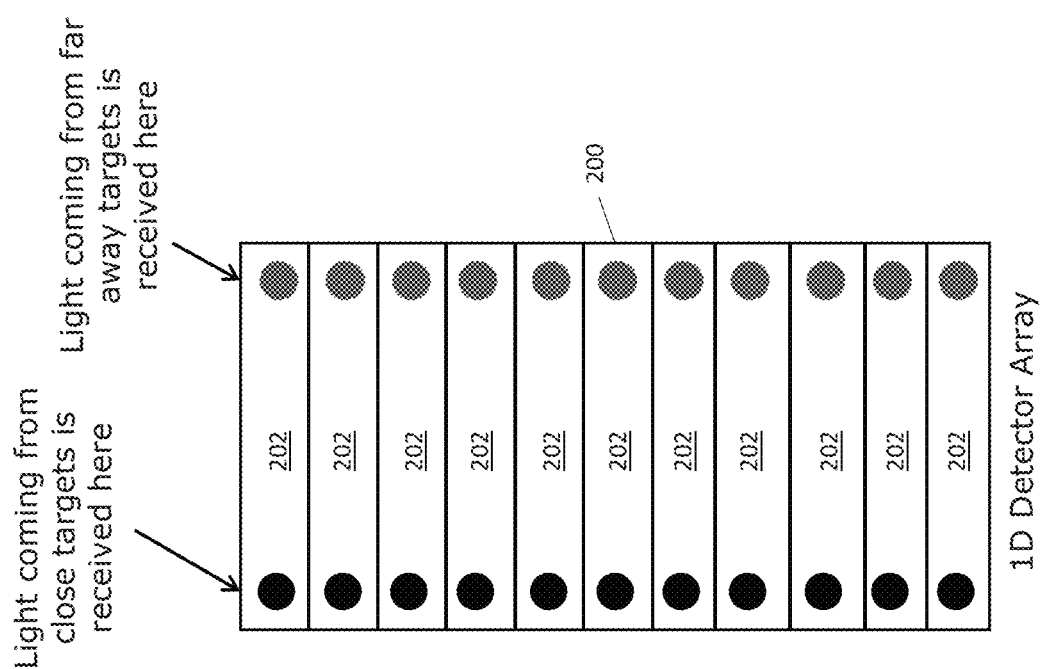
FIG. 4 illustrates a schematic diagram of a one-dimensional array of light sensors used as a light sensor of the LIDAR system shown in FIG. 1.

FIG. 4 illustrates an exemplary 1D array 200 of light sensors 202 which may be used as the light sensor 118 of the LIDAR system 100 described herein. The 1D array 200 of light sensors 202 may be a pixelated light sensor with a 1D array of individually controllable light-sensing pixels, a 1D avalanche photodiode array, etc. In other system embodiments, a 2D array of light sensors 202 may be used. Light pulses reflected off targets located at farther distances from the LIDAR system 100 impact a different part of the array 200 of light sensors 202 than light pulses reflected off targets located at closer distances. The energy of light pulses reflected off farther away targets is weaker than the energy of light pulses reflected off closer targets, where the light energy diminishes as $1/L^2$. In FIG. 4, the left-hand side of the array 200 of light sensors 202 receives stronger signals from closer targets whereas the right-hand side of the array 200 of light sensors 202 receives weaker signals from farther away targets. Hence, the output power response of the array 200 of light sensors 202 is a function of target distance (L) as shown in FIG. 5. The light detector 118 of the LIDAR system 100 has a non-uniform sensitivity response to counteract the effect of target distance on light sensor output power.

Figure 6:
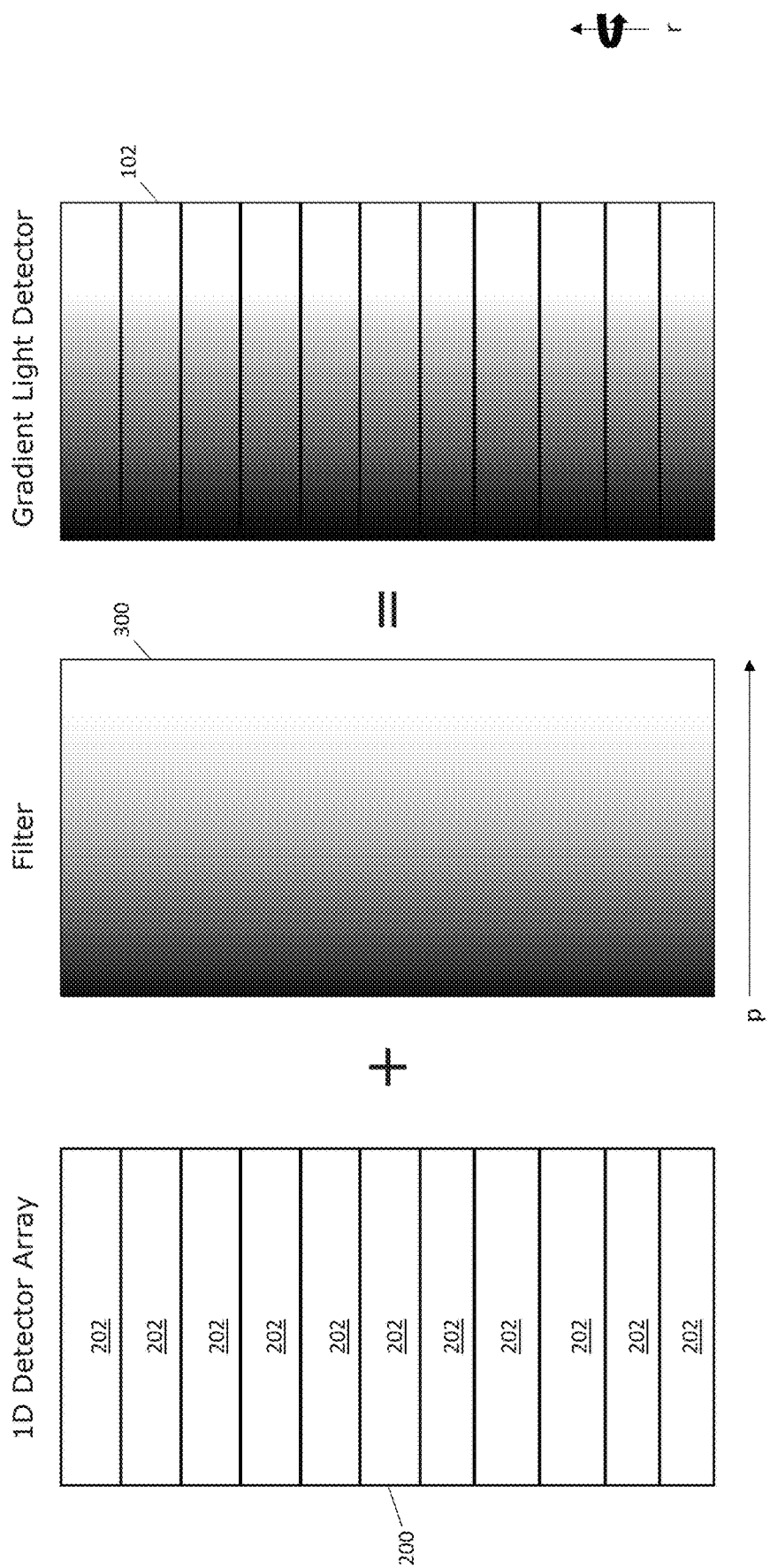
FIG. 6 illustrates a schematic diagram of an embodiment of a light detector with non-uniform sensitivity response included in the LIDAR system shown in FIG. 1.

FIG. 6 illustrates one embodiment of the light detector 102 with non-uniform sensitivity response. According to this embodiment, the light detector 102 includes a 1D array 200 of light sensors 202, e.g., of the kind described in connection with FIG. 5, and a gradient optical filter or an interference filter 300 interposed between the array 200 of light sensors 202 and the receive scanning mirror 116. The input area 122 of the light detector 102 corresponds to the combination of the 1D array 200 of light sensors 202 and the filter 300. The filter 300 has a non-uniform filter characteristic along a direction (p) which is perpendicular to the axis (r) about which the receive scanning mirror 116 rotates. Each light sensor 202 of the array 200 of light sensors extends along the direction (p) and is subjected therefore to the non-uniform sensitivity response. The non-uniform filter characteristic of the filter 300 is aligned with the receive scanning mirror parameters (e.g., speed) and light sensor size. The non-uniform filter characteristic may be chosen so that the sensitivity of the input area 122 of the light detector 102 increases as a function of the square of target distance (L) from the LIDAR system 100.

In one embodiment, the filter 100 is a metal film deposited on a surface of the array 200 of light sensors 202 facing the receive scanning mirror 116. Deposition and growth of a thin metal film may be realized by one of many variations of two main physical vapor deposition (PVD) processes: evaporation and sputtering. For example, deposition of films of metal oxide compounds by evaporation or by sputtering may proceed from a preparation of the compound as a starting material or from a base metal and subsequent reactive oxidization to the final desired composition. A refractive index gradient that varies with film thickness may be realized in the metal film. The metal film may provide a density change over a defined region of the array 200 of light sensors 202.

FIGS. 7A and 7B compare the output power response and sensitivity of the light detector 102 in FIG. 6 with and without the filter 300.

The lower half of FIG. 7A shows the sensitivity of the light detector 102 without the filter 300 over a range corresponding to target distances L1 to L2, and the upper half of FIG. 7A shows the corresponding output power response of the light detector 102. Without the filter 300, the sensitivity of the light detector 102 is uniform over the range corresponding to target distances L1 to L2. Hence, the light detector 102 will output less power (a weaker signal) for light pulses reflected off farther away targets and output more power (a stronger signal) for light pulses reflected off closer targets.

The lower half of FIG. 7B shows the sensitivity of the same light detector 102 but with the filter 300 and over the same range corresponding to target distances L1 to L2, and the upper half of FIG. 7B shows the corresponding output power response of the light detector 102. The filter 300 counteracts the effect of target distance on light sensor output power as explained above. By including a gradient optical filter or an interference filter 300 between the array 200 of light sensors 202 and the receive scanning mirror 116, the sensitivity of the light detector 102 becomes non-uniform over the range corresponding to target distances L1 to L2 of interest. As a result, the light detector 102 with the filter 300 will output generally constant power for received light pulses over the range of angles of rotation for which the light detector 102 is configured to detect reflected light pulses from the receive scanning mirror 116.

Hence, the light detector 102 with the filter 300 provides reduced dynamic range of the received signal. The light detector 102 with the filter 300 also provides reduced ambient noise, where ambient light is proportional to the area under the sensitivity curve. The light detector 102 without the filter 300 rejects ambient light according to:

$$A_0 = S(L2-L1) \quad (1)$$

where S is a constant. Assuming L2=L (the maximum target distance) and L1=0 (the minimum target distance), the sensitivity of the light detector 102 without the filter 300 simplifies to:

$$A_0 = S*L. \quad (2)$$

With the filter 300, the sensitivity of the light detector 102 is given by:

$$A_G = \int_{L1}^{L2} S(l)dl \quad (3)$$

If:

$$S(l) = \frac{S*l^2}{L^2} \quad (4)$$

then the sensitivity of the light detector 102 with the filter 300 becomes:

$$A_G = \frac{S}{L^2}\int_0^L l^2 dl = \frac{S*L^3}{3L^2} = \frac{S*L}{3} \quad (5)$$

This represents a 3× ambient light reduction and $L^2$ reduction in dynamic range as compared to no filter 300.

Figure 8:
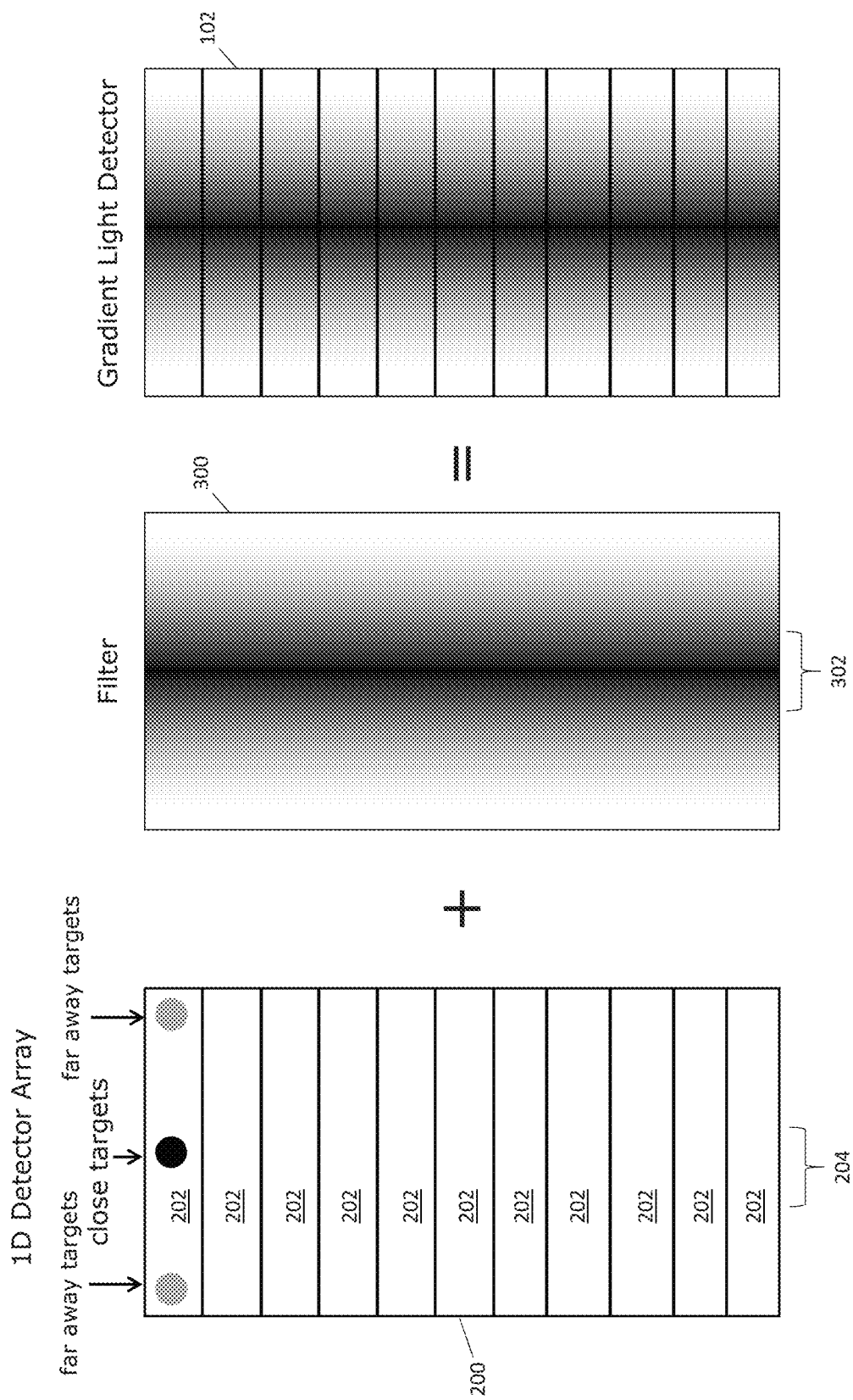
FIG. 8 illustrates a schematic diagram of another embodiment of a light detector with non-uniform sensitivity response included in the LIDAR system shown in FIG. 1.

FIG. 8 illustrates another embodiment of the light detector 102 with non-uniform sensitivity response. The embodiment illustrated in FIG. 8 is similar to the embodiment illustrated in FIG. 6. However, the receive scanning mirror 116 of the LIDAR system 100 oscillates. As a result, light pulses reflected off farther away targets impact an outer part of the array 200 of light sensors 202 and light pulses reflected off closer targets impact a central part of the array 200 of light sensors 202. The energy of light pulses reflected off farther away targets is weaker than the energy of light pulses reflected off closer targets, as the light energy diminishes by $1/L^2$. In FIG. 8, the sensitivity of the gradient optical filter or interference filter 300 interposed between the array 200 of light sensors 202 and the receive scanning mirror 116 monotonically increases with increasing distance from a central part 302 of the filter 300 which is aligned with the central part 204 of the array 200 of light sensors 202. This way, higher-energy light pulses reflected off closer targets are attenuated more in the central part 302 of the filter 300 than lower-energy light pulses reflected off farther away targets.

Figure 9A:
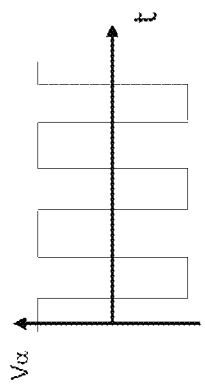
FIGS. 9A and 9B illustrate respective waveform diagrams associated with the operation of the light detector shown in FIG. 8.
Figure 9B:
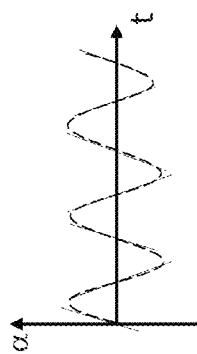

The angular speed Vα of an oscillating receive scanning mirror changes constantly between positive and negative, but the absolute value may be approximately constant over the field of view as shown in FIG. 9A. A receive scanning mirror that operates in resonance has a sinusoidal scan shape as shown in FIG. 9B. The benefits of the gradient sensitivity detector described herein such as reduced dynamic range and reduced ambient noise may be limited to the areas where the sine function is close to linear. These operating regions are indicated by straight lines in FIG. 9B, whereas the scan shape is sinusoidal like and indicated by a dashed curved line.

Figure 10:
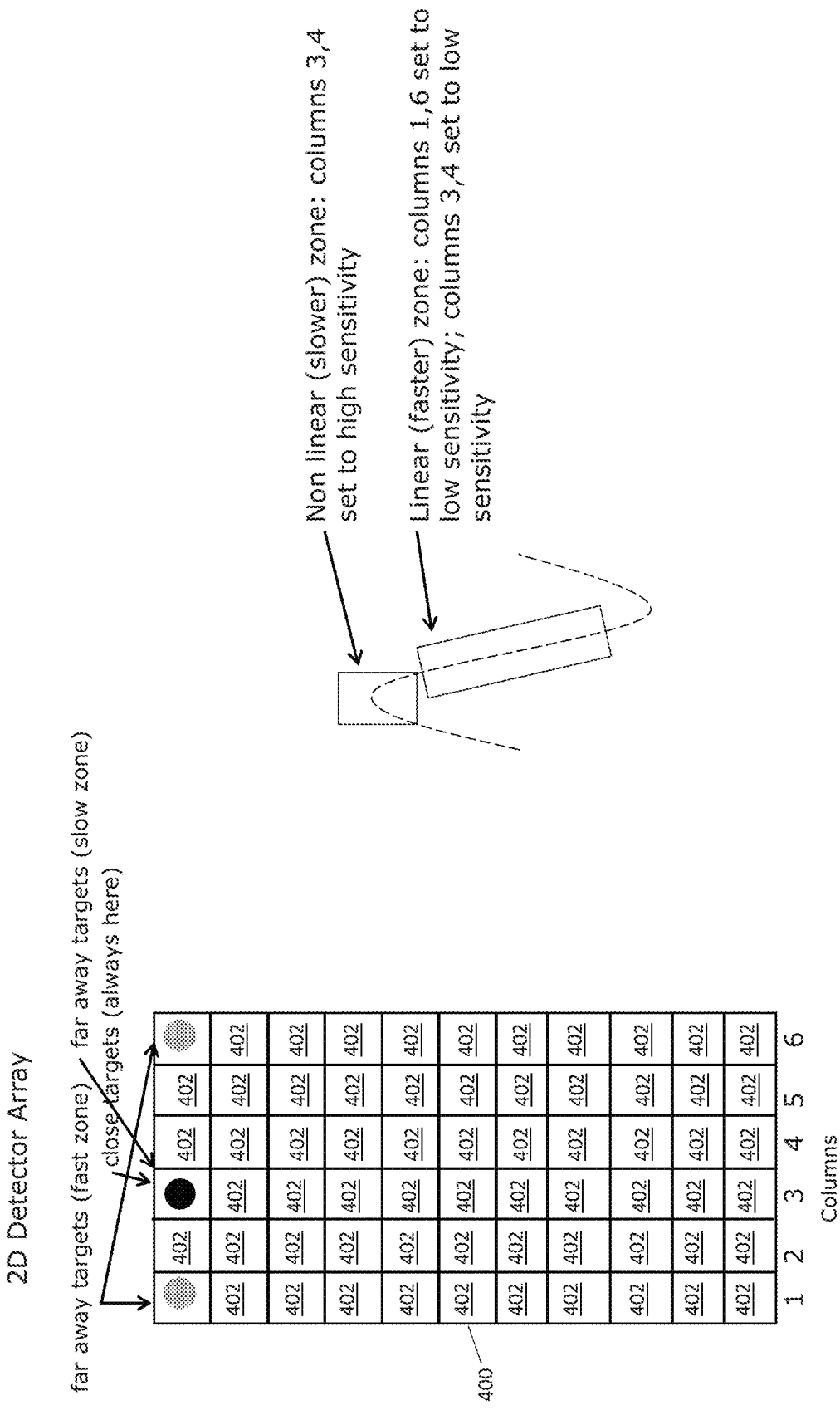
FIG. 10 illustrates a schematic diagram of another embodiment of a light detector with non-uniform sensitivity response included in the LIDAR system shown in FIG. 1.

FIG. 10 illustrates another embodiment of the light sensor 118 included in the light detector 102 of the LIDAR system 100. According to this embodiment, the light sensor 118 is a 2D array 400 of light sensors 402. The 2D array 400 of light sensors 402 may be a pixelated light sensor with a 2D array of individually controllable light-sensing pixels, a 2D avalanche photodiode array, etc. Light pulses reflected off targets located at farther distances from the LIDAR system 100 impact different parts of the 2D array 200 of light sensors 202, depending on whether the receive scanning mirror 116 is operating in a non-linear (slower) zone or a linear (faster) zone as shown in the right-hand side of FIG. 10. In the example illustrated in FIG. 10, light pulses reflected off targets located at closer distances are captured by central columns (columns 3 and 4 in the illustration) of the 2D array 400 of light sensors 402. Light pulses reflected off farther away targets are also captured by the same central columns of the 2D array 400 of light sensors 402 when the receive scanning mirror 116 is operating in the non-linear zone. Light pulses reflected off farther away targets are captured by outer columns (columns 1 and 6 in the illustration) of the 2D array 400 of light sensors 402 when the receive scanning mirror 116 is operating in the linear zone. The sensitivity of the 2D array 400 of light sensors 402 may be changed during time of flight (e.g., few microseconds for hundreds of meters), and/or may be changed during a cycle of a typical receive oscillating mirror (e.g., few hundreds of microseconds) so that the light detector 102 of the LIDAR system 100 has a non-uniform sensitivity response.

The sensitivity response of the LIDAR light detector 102 may be made non-linear by interposing a gradient optical filter or an interference filter e.g. of the kind previously described herein between the light sensor 118 and the receive scanning mirror 116 of the light detector 102, as previously described herein. In another embodiment, the light sensor 118 itself is modified to ensure the light detector 102 has a non-uniform sensitivity response along a direction which is perpendicular to the axis about which the receive scanning mirror 116 rotates.

For example, the light sensor 118 of the LIDAR light detector 102 may be an array of light sensors and each light sensor of the array of light sensors may have an input area

122 with a non-uniform sensitivity response along a direction which is perpendicular to the axis about which the receive scanning mirror 116 rotates. The array of light sensors may be a pixelated light sensor having a 1D or a 2D array of individually controllable pixels. In another example, the array of light sensors may be an avalanche photodiode array having individual pixels or groups of pixels with different sensitivities. In the case of a semiconductor-based light sensor such as a pixelated light sensor or an avalanche photodiode array, the sensitivity of individual pixels or groups of pixels can be varied across the array by varying the doping concentration within individual pixels or groups of pixels. For example, in the case of an avalanche photodiode array, the doping concentration in one or more p-type and/or n-type regions of individual pixels or groups of pixels may be varied to yield the desired non-uniform sensitivity response.

The LIDAR system 100 described herein may be used in various applications having a need for object detection, object ranging and/or object recognition. A few non-limiting examples include in-building navigation equipment such as service robots, automatic parking of vehicles, workpiece detection and orientation during fabrication, to name a few.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A light detection and ranging (LIDAR) system, comprising:
  a light detector including a first scanning mirror and a light sensor aligned with the first scanning mirror,
  wherein the first scanning mirror is configured to rotate about a first axis and to reflect incident light pulses toward the light sensor at different angles of rotation with respect to the first axis,
  wherein the light sensor is configured to detect reflected light pulses from the first scanning mirror over a range of the angles of rotation, and
  wherein an input area of the light detector has a non-uniform sensitivity response along a first direction,
  the LIDAR system further comprising a light transmitter configured to emit light pulses, wherein the rotation of the first scanning mirror is synchronized to a scanning of the light transmitter.

2. The LIDAR system of claim 1, wherein the light detector comprises an array of light sensors and a gradient optical filter interposed between the array of light sensors and the first scanning mirror, and wherein the gradient optical filter has a non-uniform filter characteristic along the first direction.

3. The LIDAR system of claim 2, wherein the gradient optical filter comprises a metal film deposited on a surface of the array of light sensors facing the first scanning mirror.

4. The LIDAR system of claim 2, wherein the filter characteristic of the gradient optical filter monotonically increases with increasing distance from a central part of the gradient optical filter, and wherein the central part of the gradient optical filter is aligned with a central part of the array of light sensors.

5. The LIDAR system of claim 2, wherein the first scanning mirror is a one-dimensional or two-dimensional MEMS mirror configured to rotate about a single axis.

6. The LIDAR system of claim 1, wherein the light detector comprises an array of light sensors, and wherein each light sensor of the array of light sensors comprises an input area having a non-uniform sensitivity response along the first direction.

7. The LIDAR system of claim 1, wherein the light detector comprises an avalanche photodiode array, and wherein individual pixels or groups of pixels of the avalanche photodiode array have different sensitivities.

8. The LIDAR system of claim 1, wherein the light detector comprises an array of light sensors and an interference filter interposed between the array of light sensors and the first scanning mirror, and wherein the interference filter has a non-uniform filter characteristic along the first direction.

9. The LIDAR system of claim 1, wherein the light detector comprises an array of sensors and the output from the array of sensors in the first direction corresponds to an distance between the LIDAR system and a target from which detected reflected light pulses are reflected, and wherein the sensitivity of the input area of the light detector increases in the first direction as a function of the square of the respective target distance from the LIDAR system.

10. The LIDAR system of claim 1, wherein the light transmitter comprises a second scanning mirror, and wherein a rotation of the first scanning mirror is synchronized with a rotation of the second scanning mirror so that the rotation of the first scanning mirror and the rotation of the second scanning mirror have the same frequency.

11. The LIDAR system of claim 10, wherein the second scanning mirror is a one-dimensional or two-dimensional MEMS mirror.

12. The LIDAR system of claim 1, wherein LIDAR system is a coaxial LIDAR system.

13. A light detection and ranging (LIDAR) system, comprising:
  a first scanning mirror;
  an array of light sensors; and
  a gradient optical filter interposed between the array of light sensors and the first scanning mirror,
  wherein the first scanning mirror is configured to reflect incident light pulses toward the array of light sensors at different angles of rotation with respect to a first axis, and
  wherein the gradient optical filter has a non-uniform filter characteristic along a first direction.

14. The LIDAR system of claim 13, wherein the gradient optical filter comprises a metal film deposited on a surface of the array of light sensors facing the first scanning mirror.

15. The LIDAR system of claim 13, wherein the filter characteristic of the gradient optical filter monotonically increases with increasing distance from a central part of the gradient optical filter, and wherein the central part of the gradient optical filter is aligned with a central part of the array of light sensors.

16. The LIDAR system of claim 13, wherein the first scanning mirror is a one-dimensional MEMS mirror configured to rotate about a single axis.

17. The LIDAR system of claim 13, wherein the filter characteristic of the gradient optical filter increases as a function of the square of target distance from the LIDAR system.

18. The LIDAR system of claim 13, wherein the array of light sensors is configured to output generally constant power over the range of angles of rotation for which the array of light sensors is configured to detect reflected light pulses from the first scanning mirror.

19. The LIDAR system of claim 13, further comprising:
a light transmitter configured to transmit first and second light pulses in a first transmit direction,
wherein at a first angle of rotation, the first scanning mirror is configured to reflect the first light pulse reflected by an object at a first distance from the LIDAR system toward a first region of the input area of the array of light sensors,
wherein at a second angle of rotation, the first scanning mirror is configured to reflect the second light pulse reflected by an object at a second distance from the LIDAR system toward a second region of the input area of the array of light sensors, and
wherein the first and second regions of the input area of the array of light sensors have different sensitivity responses.

20. A method of operating a light detection and ranging (LIDAR) system having a scanning light transmitter configured to emit light pulses and a light detector that includes a first scanning mirror and a light sensor aligned with the first scanning mirror, an input area of the light detector having a non-uniform sensitivity response along a first direction, the method comprising:
rotating the first scanning mirror about a first axis, in synchronization with the scanning light transmitter, to reflect incident light pulses toward the light sensor at different angles of rotation with respect to the first axis, wherein at a first angle of rotation the first scanning mirror reflects a first light pulse transmitted by a transmit scanner of the LIDAR system in a first transmit direction and reflected by an object at a first distance from the LIDAR system toward a first region of the input area of the light detector, and wherein at a second angle of rotation the first scanning mirror reflects a second light pulse transmitted by the transmit scanner in the first transmit direction and reflected by an object at a second distance from the LIDAR system toward a second region of the input area of the light detector, wherein the first and second regions of the input area of the light detector have different sensitivity responses; and
detecting reflected light pulses from the first scanning mirror at the light sensor over a range of the angles of rotation.

* * * * *

UNITED STATES PATENT AND TRADEMARK OFFICE
CERTIFICATE OF CORRECTION

| | |
|---|---|
| PATENT NO. | : 11,275,146 B2 |
| APPLICATION NO. | : 16/184561 |
| DATED | : March 15, 2022 |
| INVENTOR(S) | : B. Kirillov |

It is certified that error appears in the above-identified patent and that said Letters Patent is hereby corrected as shown below:

In the Claims

Column 12, Line 34 (Claim 9, Line 3) please change "to an" to -- to a --

Column 12, Line 49 (Claim 12, Line 1) please change "wherein LIDAR" to -- wherein the LIDAR --

Signed and Sealed this
Seventeenth Day of May, 2022

*Katherine Kelly Vidal*

Katherine Kelly Vidal
*Director of the United States Patent and Trademark Office*